(No Model.)
S. R. CAMPBELL.
ADJUSTABLE BEARING.
No. 247,301. Patented Sept. 20, 1881.
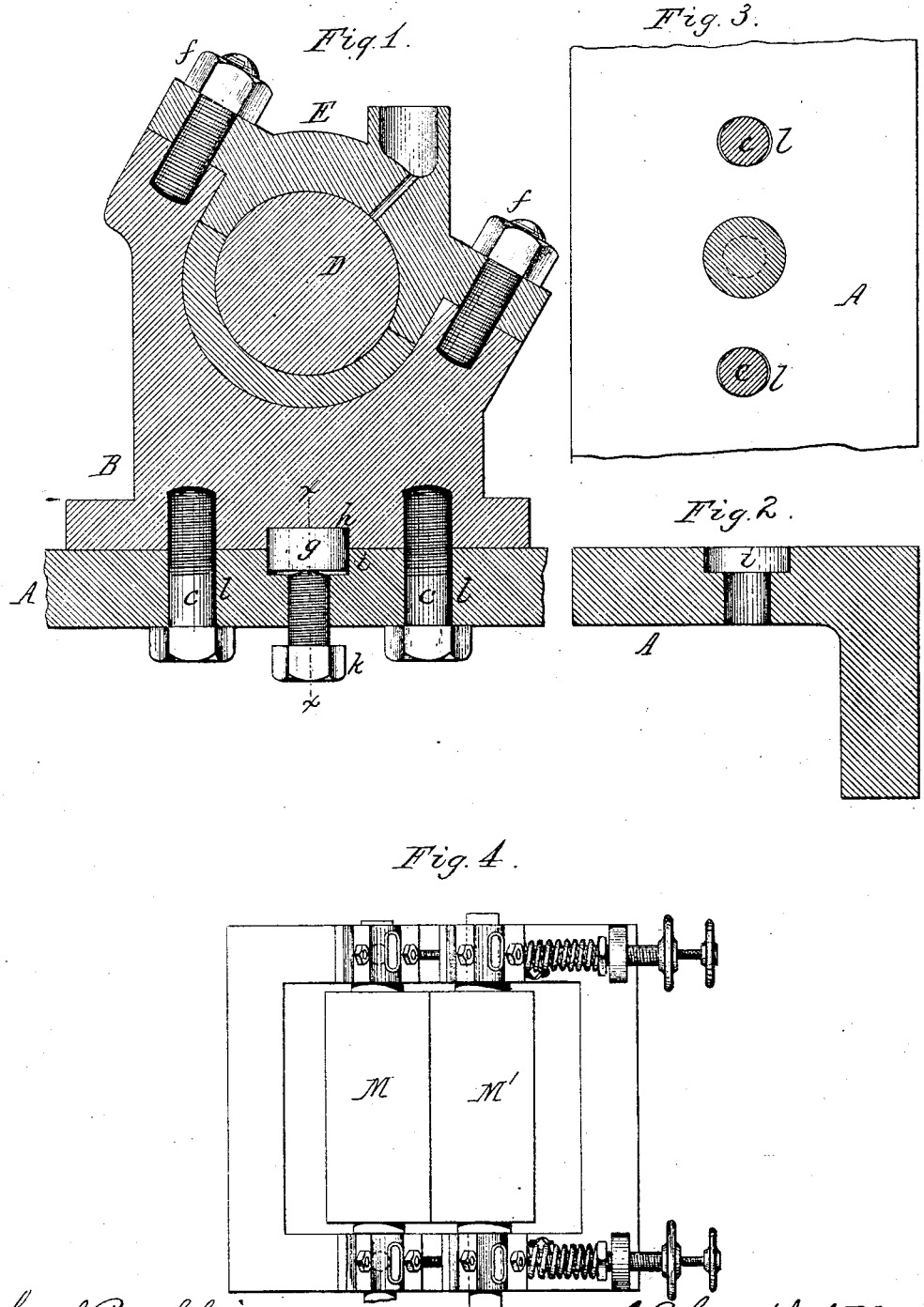

UNITED STATES PATENT OFFICE.

SAMUEL R. CAMPBELL, OF BUFFALO, NEW YORK, ASSIGNOR TO RICHARD K. NOYE AND E. HAYWARD NOYE, BOTH OF SAME PLACE.

ADJUSTABLE BEARING.

SPECIFICATION forming part of Letters Patent No. 247,301, dated September 20, 1881.

Application filed August 1, 1881. (No model.)

*To all whom it may concern:*

Be it known that I, SAMUEL R. CAMPBELL, of the city of Buffalo, in the county of Erie and State of New York, have invented new and useful Improvements in Adjustable Bearings, of which the following is a specification.

My invention relates more especially to a journal-bearing which is adjustable on its support, so that the direction of the axis of the bearing can be adjusted when necessary in order to bring the axes of two or more bearings in a straight line.

My improved bearing is more particularly designed to be employed for supporting the shaft of the stationary roller in roller-mills for grinding grain and other substances, but it may be used with advantage in machines for various other purposes.

My invention consists of a journal-bearing connected with its support by a pivot standing at right angles to the contiguous surfaces of the bearing and its support, so that the position of the axis of the bearing can be adjusted by turning the bearing on its pivot; also, of the particular construction of the pivot and the parts whereby the bearing is secured to its support, as will be hereinafter fully set forth.

In the accompanying drawings, Figure 1 is a vertical cross-section of my improved bearing. Fig. 2 is a vertical section of the supporting-frame in line $x$ $x$, Fig. 1. Fig. 3 is a fragmentary top-plan view of the frame. Fig. 4 is a top-plan view on a reduced scale of a roller-mill provided with my improved bearings.

Like letters of reference refer to like parts in the several figures.

A represents the frame or other stationary part of the machine or any other suitable support to which the bearing is secured.

B represents the lower part or body of the bearing resting upon the frame or support A, and secured thereto by two or more screw-bolts, $c$.

D represents the journal turning in the bearing, and E is the cap of the bearing attached to the body B by screw-bolts $f$.

$g$ represents a pivot seated in the contiguous faces of the frame A and the body B of the bearing, and arranged at right angles to the axis of the journal-bearing and centrally under the same. The pivot $g$ consists of a cylindrical block of steel which is seated in a cylindrical recess, $h$, formed in the under side of the body B of the bearing, and a similar recess, $i$, formed in the upper side of the frame A. The block $g$ is rendered adjustable toward and from the body B of the bearing by a set-screw, $k$, bearing against the under side of the block and working in a threaded hole in the frame A.

When the screw-bolts $c$ are loosened the bearing is capable of a limited movement on the pivot $g$, the holes $l$ in the frame A through which the screw-bolts $c$ pass being slightly elongated or enlarged, as shown in Fig. 3, to permit of the requisite movement of the bearing on its pivot. The screw-holes $l$ are drilled in the frame A as nearly in their proper places as possible, so that the bearing will require but little if any adjustment when secured in place in order to properly support the journal, the intention being rather to compensate by the within-described adjustment for inaccuracies and imperfections of workmanship and other slight deviations from the correct position, than for a general adjustment of the bearing.

In the roller-mill represented in Fig. 4, M represents the roller supported in stationary bearings, and M' the roller supported in movable bearings. It frequently becomes necessary to slightly adjust the bearings of the roller M in order to render them parallel with the shaft of the roller, and this is readily accomplished by loosening the bolts $c$ in both bearings of the roller M, and bringing both rollers together, when the bearings of the roller M will adjust themselves on their pivots and hold the shaft of the roller M parallel with the roller M'.

The aggregate depth of the recesses $h$ and $i$ in which the pivot $g$ is placed slightly exceeds the height of the pivot, so that the pivot will have some play in the recess and permit the face of the bearing B to rest firmly against the frame A. After the bolts $c$ are tightened, so as to secure the bearing B firmly in place, the set-screw $k$ is tightened against the pivot to take up this play.

When the journal-bearing has become worn to such an extent that the bearing requires to be raised, a lining of thin sheet metal or other suitable material is generally placed between the bearing and the frame, whereby the depth of the recesses in which the pivot-block $g$ is arranged is correspondingly increased. This excess of play is readily taken up by adjusting the set-screw $k$, thereby forming a solid support under the center of the bearing. The pivot $g$, by fitting snugly in the cavities of the bearing and frame, serves as a key which receives the lateral thrust of the bearing when the machine is in operation and prevents the bearing from being crowded back and relieves the loosely-fitted bolts $c$ from this thrust.

I claim as my invention—

1. An adjustable journal-bearing provided in its base with a pivot arranged at right angles to the contiguous surfaces of the bearing and its support, and means whereby the bearing is secured in position, substantially as set forth.

2. The combination, with the support A, provided with a recess, $i$, of the bearing B, provided with a recess, $h$, a pivot-block, $g$, arranged in the recesses $h\ i$, and means whereby the bearing is adjustably secured to its support, substantially as set forth.

3. The combination, with the support A, provided with a recess, $i$, of the bearing B, provided with a recess, $h$, a pivot-block, $g$, arranged in the recesses $h\ i$, a set-screw, $k$, bearing against the pivot-block $g$, and screw-bolts $c$, passing through elongated holes in the support A, substantially as set forth.

SAMUEL R. CAMPBELL.

Witnesses:
GEORGE MANN,
JOHN E. HARTNETT.